US009657744B2

(12) United States Patent
Gilarranz et al.

(10) Patent No.: US 9,657,744 B2
(45) Date of Patent: May 23, 2017

(54) MIDSPAN ACTIVE MAGNETIC BEARING (71) Applicant: DRESSER-RAND COMPANY, Olean, NY (US)

(72) Inventors: Jose L. Gilarranz, Katy, TX (US); Timothy R. Griffin, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 663 days.

(21) Appl. No.: 14/173,894

(22) Filed: Feb. 6, 2014

(65) Prior Publication Data

US 2014/0227079 A1 Aug. 14, 2014

Related U.S. Application Data (60) Provisional application No. 61/764,309, filed on Feb. 13, 2013.

(51) Int. Cl.
*F04D 29/058* (2006.01)
*F04D 29/056* (2006.01)
(Continued)

(52) U.S. Cl.
CPC ......... *F04D 29/056* (2013.01); *F04D 17/122* (2013.01); *F04D 25/0686* (2013.01);
(Continued)

(58) Field of Classification Search
CPC ...... F04D 29/10; F04D 29/102; F04D 29/104; F04D 29/106; F04D 29/108; F04D 29/12;
(Continued)

(56) References Cited

U.S. PATENT DOCUMENTS 4,141,604 A * 2/1979 Habermann ............ F01D 25/16
310/90.5
4,983,870 A 1/1991 McSparran
(Continued)

FOREIGN PATENT DOCUMENTS

| EP | 0301285 A1 | 2/1989 |
| WO | 2012057885 A1 | 5/2012 |
| WO | 2012145486 A2 | 10/2012 |

OTHER PUBLICATIONS

PCT/US2014/015212—Notification of Transmittal of the International Search Report and the Written Opinion of the International Searching Authority, or the Declaration, International Search Report, Written Opinion of the International Searching Authority, dated May 20, 2014, 9 pages.
(Continued)

*Primary Examiner* — Richard Edgar (57) ABSTRACT

A compression system may include a compressor having first and second sides separated by a division wall, first and second shafts, and first and second radial bearings. The first and second shafts may be axially connected to each other at respective first ends via a rotor portion of an intermediate radial bearing. The rotor portion may include a plurality of laminations stacked between first and second plates fastened to each other. The first radial bearing may be disposed on a first side of the intermediate radial bearing and may be proximate a second end of the first shaft. The first radial bearing may be configured to support the first shaft. The second radial bearing may be disposed on a second side of the intermediate radial bearing and may be proximate a second end of the second shaft. The second radial bearing may be configured to support the second shaft.

18 Claims, 4 Drawing Sheets

(51) Int. Cl.
| | |
|---|---|
| *F04D 29/26* | (2006.01) |
| *F04D 25/06* | (2006.01) |
| *F04D 17/12* | (2006.01) |
| *F04D 29/054* | (2006.01) |
| *F16D 1/02* | (2006.01) |
| *F16C 32/04* | (2006.01) |

(52) U.S. Cl.
CPC ......... *F04D 29/054* (2013.01); *F04D 29/058* (2013.01); *F04D 29/266* (2013.01); *F16D 1/02* (2013.01); *F16C 32/04* (2013.01); *Y10T 29/49236* (2015.01)

(58) Field of Classification Search
CPC .... F04D 29/122; F04D 29/124; F04D 29/126; F04D 29/128; F04D 29/04; F04D 29/0405; F04D 29/043; F04D 29/044; F04D 29/046; F04D 29/054; F04D 29/056; F04D 29/048; F04D 29/058; F04D 29/266; F04D 1/06; F04D 17/122; F04D 25/0686; F16D 1/02
See application file for complete search history.

(56) References Cited

U.S. PATENT DOCUMENTS

| | | |
|---|---|---|
| 5,347,190 A | 9/1994 | Lewis et al. |
| 5,514,924 A | 5/1996 | McMullen et al. |
| 6,111,333 A | 8/2000 | Takahashi et al. |
| 6,518,770 B2 | 2/2003 | Childs |
| 6,763,285 B2 | 7/2004 | Setiawan et al. |
| 7,884,521 B2 | 2/2011 | Buhler et al. |
| 8,851,756 B2 | 10/2014 | Maier et al. |
| 8,876,389 B2 | 11/2014 | Maier et al. |
| 8,994,237 B2 | 3/2015 | Griffin et al. |
| 9,024,493 B2 | 5/2015 | Gilarranz et al. |
| 2002/0037772 A1 | 3/2002 | Fisch et al. |
| 2004/0164632 A1 | 8/2004 | Brunet et al. |
| 2007/0110596 A1 | 5/2007 | Weeber et al. |

OTHER PUBLICATIONS

PCT/US2014/015212—International Preliminary Report on Patentability, Written Opinion of the International Searching Authority, dated Aug. 18, 2015, 5 pages.
EP 14 75 1831 Supplementary European Search Report dated Sep. 6, 2016.

* cited by examiner

MIDSPAN ACTIVE MAGNETIC BEARING

CROSS REFERENCE TO RELATED APPLICATIONS

This application claims priority to U.S. Provisional Patent Application having Ser. No. 61/764,309, which was filed Feb. 13, 2013. This priority application is hereby incorporated by reference in its entirety into the present application to the extent consistent with the present application.

BACKGROUND

A rotating shaft in a turbomachine, such as a turbocompressor or turbine, is typically mounted using two radial bearings near the ends of the shaft. Two types of radial bearings that are primarily used are magnetic bearings and oil film bearings. For most turbomachine applications, however, magnetic bearings provide the potential to offer superior performance over oil film bearings, as magnetic bearings provide adequate stiffness, damping, and load capacity, with a reduced power consumption due to reduced viscous and windage losses. Moreover, oil film bearings require lubrication and auxiliary systems such as valves, pumps, filters, coolers, and the like, all of which pose a risk of process contamination.

Magnetic bearings can be either active or passive. Active magnetic bearings typically include electromagnetic coils surrounding a ferromagnetic shaft, shaft position sensors, and a control system. In response to signals received from the shaft position sensors, the control system adjusts the electrical current supplied to the electromagnetic coils, thereby adjusting a magnetic field that levitates and/or centralizes the ferromagnetic shaft. Passive magnetic bearings, on the other hand, use permanent magnets rather than electromagnets to position and support the shaft and therefore depend heavily on permanent ferromagnetic attraction or repulsion forces. The stiffness and damping of passive magnetic bearings, however, are much less than active magnetic bearings and they are inherently unstable since it is nearly impossible to stably support a shaft using only passive magnetic bearings. Therefore, in general, active magnetic bearings are usually utilized in addition to the permanent magnet bearings in the axial and radial direction.

Adequate bearing support for the shaft may be utilized to prevent contact between the stationary and rotating components of the turbomachine. Also, appropriate bearing support may be provided to control the deflection of the shaft throughout the operating speed range of the turbomachine. To increase turbomachine performance, the shaft length may be increased to accommodate more rotating assemblage, such as impellers or wheels. Typically, the shaft length is increased by joining two shafts end to end using a tie-bolted joint or the like. However, increasing the shaft length between the radial bearings and adding more impellers or wheels may make the rotordynamics of the rotor more challenging to control and may result in increased shaft vibration/deflection that causes contact between the rotating and stationary components of the turbomachine resulting in damage.

Accordingly, there is a need for a magnetic bearing system that provides additional shaft support (for example, stiffness and damping) between the two shaft bearings to provide the capability of implementing more impellers or wheels without adversely affecting turbomachine rotordynamics, and increases the stiffness and compactness of the joint between the two shafts.

SUMMARY

Embodiments of the disclosure may provide a compression system. The compression system may include a housing, a compressor within the housing, a first shaft and a second shaft disposed within the compressor, a first radial bearing, a second radial bearing and an intermediate radial bearing. The compressor may have a first side and a second side separated by a division wall. Each of the first shaft and the second shaft may have a first end and a second end. The first shaft and the second shaft may be axially connected to each other at the respective first ends and may be configured to rotate together. The first radial bearing may be disposed proximate the second end of the first shaft and may be configured to support the first shaft. The second radial bearing may be disposed proximate the second end of the second shaft and may be configured to support the second shaft. The intermediate radial bearing may be disposed at or adjacent the division wall, between the first radial bearing and the second radial bearing, and proximate the connected first ends of the first shaft and the second shaft.

Embodiments of the disclosure may provide a method for supporting at least two shafts. The method may include disposing the at least two shafts in a compressor having a first side and a second side separated by a division wall. The at least two shafts may be axially connected to each other at respective first ends of the at least two shafts. The method may also include supporting a first shaft of the at least two shafts with a first radial bearing proximate a second end of the first shaft, and supporting a second shaft of the at least two shafts with a second radial bearing proximate a second end of the second shaft. Further, the method may include supporting the first ends of the at least two shafts with an intermediate radial bearing disposed at or adjacent the division wall. The intermediate radial bearing may be disposed between the first radial bearing and the second radial bearing and may be proximate the connected first ends of the first shaft and the second shaft.

Embodiments of the disclosure may provide a compression system. The compression system may include a compressor having a first side and a second side separated by a division wall, a first shaft and a second shaft within the compressor, a first radial bearing, and a second radial bearing. The first shaft and the second shaft may be axially connected to each other at respective first ends via a rotor portion of an intermediate radial bearing. The rotor portion may include a plurality of laminations stacked between a first plate and a second plate fastened to each other. The first radial bearing may be disposed on a first side of the intermediate radial bearing and may be proximate a second end of the first shaft. The first radial bearing may be configured to support the first shaft. The second radial bearing may be disposed on a second side opposite to the first side of the intermediate radial bearing and may be proximate a second end of the second shaft. The second radial bearing may be configured to support the second shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
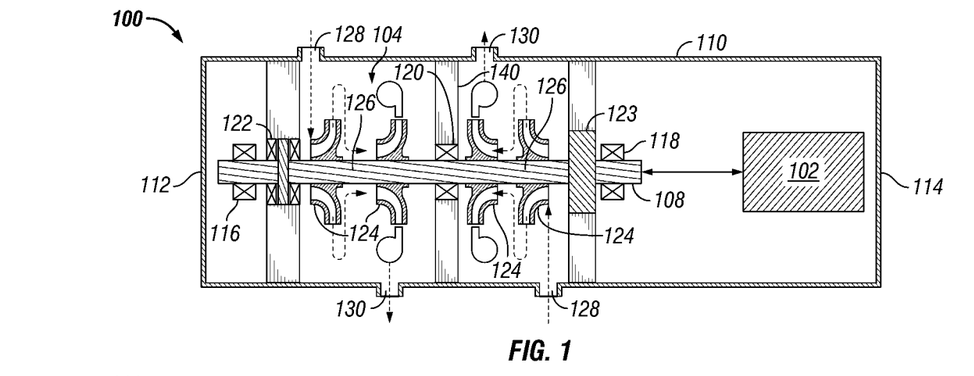
FIG. 1 illustrates a cross-sectional view of an exemplary compression system, according to one or more embodiments disclosed.

FIG. 1 illustrates an exemplary compression system 100, according to one or more embodiments disclosed. The compression system 100 generally includes a driver 102 coupled to a compressor 104 via a rotatable shaft 108. In one embodiment, when the driver 102 operates, it drives the compressor 104, generally at the same rotational speed, i.e., without gear reduction between the two components. Alternatively, the driver 102 may be configured to adjust the rotational speed of the compressor 104 using gears or the like. The driver 102 may be an electric motor, e.g., turbines, engines, etc, but may also be any other type of driver typically used for rotating compressors. The compressor 104 may be a multi-stage centrifugal compressor with one or more wheels or impellers 124 in each compressor stage. The compressor 104 may be a back-to-back or dual-sided centrifugal compressor.

The driver 102 and the compressor 104 may each be disposed within a housing 110 having a first end, or compressor end 112, and a second end, or driver end 114. The housing 110 will generally hermetically-seal the driver 102 and the compressor 104 therein, thus providing both support and protection for each component during operation. In at least one embodiment, more than one driver 102 may be used to drive the compressor 104. For example, a second driver (not shown) may be coupled in series with the driver 102, or the second driver may be arranged on the compressor end 112 of the housing 110 to work in cooperation with the driver 102 and thereby provide more power and torque than could be achieved with the use of a single driver. In yet another embodiment, the driver 102 may be arranged outside of the hermetically-sealed housing 110, without departing from the scope of the disclosure.

The shaft 108 may be supported at or proximate each end, respectively, by at least one radial bearing, such as first and second radial bearings 116 and 118 (e.g., the first radial bearing 116 supports the first end of the shaft 108 and the second radial bearing 118 supports the second end of the shaft 108). The shaft 108 may be further supported at an intermediate location between the first and second radial bearings 116, 118 by at least one intermediate or midspan radial bearing 120. The radial bearings 116, 118, and 120 may be arranged along the length of the shaft 108 that allows the compression system 100 to increase production by including more impellers 124 without adversely affecting shaft 108 rotordynamics. For example, employing the midspan or intermediate radial bearing 120 between the first and second radial bearings 116, 118 may allow the shaft 108 to be lengthened to accommodate additional impellers 124 while simultaneously providing added support and stability to the shaft 108, allowing the shaft 108 to have an acceptable rotordynamic behavior. In exemplary embodiments, it may be beneficial to use a magnetic bearing instead of an oil bearing as the intermediate radial bearing 120. This may simplify the design of the compressor since difficulty associated with having an oil bearing in the compressor may be minimized. As illustrated in FIG. 1, the intermediate radial bearing 120 may be arranged between axially-adjacent impellers 124 of the compressor 104.

The intermediate radial bearing 120 may be arranged generally at or near a division wall 140 (detailed below) separating the compressor 104 into two sides. The shaft 108 may be comprised of two compressor shafts 126 axially connected to each other using a tie-bolted joint generally at or near the division wall 140. As illustrated in FIG. 1, the first radial bearing 116 may be connected to the first compressor shaft 126 at or near the compressor end 112, and the second radial bearing 118 may be connected to the second compressor shaft 126 at or near the driver end 114. The intermediate radial bearing 120 may be used to support the shaft 108 at a location adjacent the tie-bolted joint in the shaft 108. Placing the intermediate radial bearing 120 in this fashion may increase the stiffness and compactness of the tie-bolted joint. As mentioned above, lengthening the shaft may enable the simultaneous use of two or more active magnetic bearings in a single compressor body. The use of more than two active magnetic bearings may permit additional stages of compression to be added to the compressor 104 which may result in the compressor being able to generate additional head. The additional bearings may provide added load-carrying capacity and additional stiffness and damping to improve the rotordynamic response of an otherwise long and flexible two bearing rotor system that would be otherwise challenged from the standpoint of rotordynamic stability and/or vibration response.

Each radial bearing 116, 118, and 120 may be directly or indirectly supported by the housing 110 and may provide support for the compressor 104 as the shaft 108 rotates during the compression system 100 operation. In addition, at least one axial thrust bearing 122 may be provided at or near the end of the shaft 108 adjacent the compressor end 112 of the housing 110, and may be configured to bear axial thrusts generated by the compressor 104. In one embodiment, the axial thrust bearing 122 may be a magnetic bearing, such as an active magnetic bearing. In other embodiments, however, the axial thrust bearing 122 may be an oil lubricated bearing or other type of bearing suitable for rotordynamic damping in high speed turbomachinery.

A balance piston 123, including an accompanying balance piston seal (not shown), may be arranged on the shaft 108 between the driver 102 and the compressor 104. Due to the pressure rise developed through the compressor 104, a pressure difference may be created such that the compressor 104 may have a net thrust in the direction of its inlets 128. Arranging the balance piston 123 behind the last impeller 124 of the compressor 104 may counteract that force. As can be appreciated, any thrust generated by the compressor 104 that may not be absorbed by the balance piston 123 may be otherwise absorbed by the axial thrust bearing 122.

During operation of the compression system 100, the driver 102 drives the shaft 108 and the compressor 104. A process gas to be compressed may be introduced into the compression system 100 via the inlets 128. The process gas may include, but is not limited to, a mixture of hydrocarbon gas, such as natural gas or methane derived from a production field or via a pressurized pipeline. In other embodiments, the process gas may include air, $CO_2$, $N_2$, ethane, propane, i-$C_4$, n-$C_4$, i-$C_5$, n-$C_5$, combinations thereof, and/or any other process gas(es). In at least one embodiment, for example, in subsea oil and gas applications, the process gas may be "wet," having both liquid and gaseous components, or otherwise include a mixture of higher-density and lower-density components. Accordingly, the first impeller 124 may directly receive the process gas via the inlets 128 for compression.

The compressor 104 may be configured to receive the substantially dry process gas from the inlets 128 and compress the dry process gas through the successive stages of impellers 124 and thereby produce a compressed process gas. The compressed process gas may then exit the compressor 104 via outlets 130. It should be noted that the location of the inlets 128 and outlets 130 may not be restricted to the locations illustrated in FIG. 1. For example, the inlets 128 and the outlets 130 may all be on the top (with respect to FIG. 1), may all be on the bottom (with respect to FIG. 1), or may be at any location on the compressor 104 as per design requirements.

Each radial bearing 116, 118, and 120 may be one of several different types of radial bearings without departing from the scope of the disclosure. For example, the radial bearings 116, 118, and 120 may be magnetic bearings, such as active or passive magnetic bearings. In one embodiment, each radial bearing 116, 118, and 120 may be active magnetic bearings controlled either independently by separate channel sets in a bearing control system (not shown) or jointly by a single set of channels in the bearing control system. In other embodiments, two of the radial bearings 116, 118, and 120 may be active magnetic bearings, and the remaining radial bearing may be a passive magnetic bearing or other type of radial bearing besides an active magnetic bearing. In such an embodiment, the active magnetic bearings and the passive magnetic bearing may be controlled independent of each other using separate channels in the bearing control system. It will be appreciated that any combination of radial bearings 116, 118, 120 may be arranged in the compression system 100 to fit any number of applications without departing from the scope of the disclosure.

Figure 2:
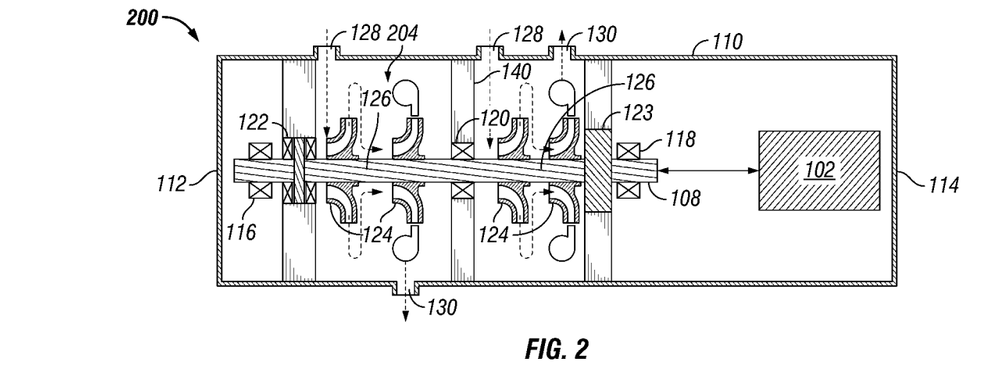
FIG. 2 illustrates a cross-sectional view of another exemplary compression system, according to one or more embodiments disclosed.

Referring now to FIG. 2, illustrated is another compression system 200, according to one or more embodiments disclosed. The compression system 200 may be similar in some respects to the compression system 100 described above and therefore may again be best understood with reference to the description of FIG. 1 where like numerals designate like components and will not be described again in detail. As illustrated, the compression system 200 may include a compressor 204, for example, a straight through centrifugal compressor, and the process gas to be compressed may be introduced into the compression system 200 via the inlets 128 and fed directly to the first impeller 124 of the compressor 204 for compression. The intermediate radial bearing 120 may be arranged generally at or near a division wall 140 (detailed below) separating the compressor 204 into two sides. It should be noted that the location of the inlets 128 and outlets 130 may not be restricted to the locations illustrated in FIG. 2. For example, the inlets 128 and the outlets 130 may all be on the top (with respect to FIG. 2), may all be on the bottom (with respect to FIG. 2), or may be at any location on the compressor 204 as per design requirements.

Figure 3:
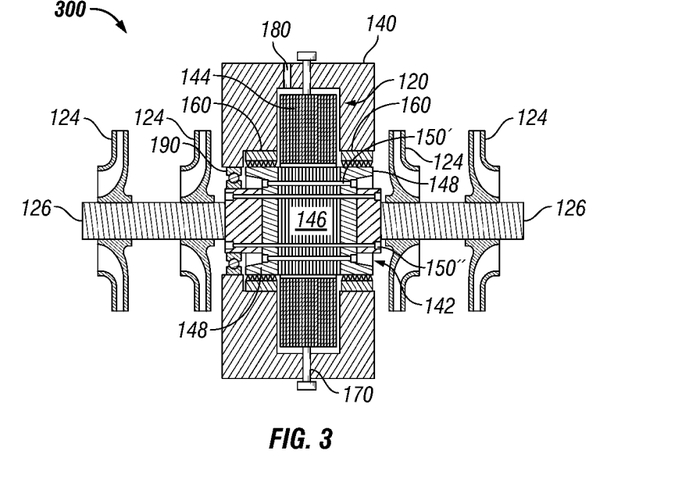
FIG. 3 illustrates a cross-sectional view of a configuration of a division wall and an intermediate radial bearing of the exemplary compression system of FIG. 1, according to one or more embodiments disclosed.

FIG. 3 illustrates a cross-sectional view of a configuration 300 of a division wall 140 and an intermediate radial bearing 120 of the exemplary compression system 100 of FIG. 1, according to one or more embodiments disclosed. As mentioned above, the intermediate radial bearing 120 may be arranged generally at or near the division wall 140 separating the two sides of the compressor 104. The intermediate radial bearing 120 may be an active magnetic bearing. A rotor 142 of the intermediate radial bearing 120 may be composed of a stack of laminations 146 (for example, laminations composed of iron) sandwiched between two flat plates 148 that may be bolted together using a tie-bolted joint 150'. The compressor shafts 126 on each end of the flat plates 148 may be bolted (for example, using suitable fasteners) onto these flat plates 148 and/or to each other using tie-bolts 150" that pass through the stack of laminations 146. An axially split bearing stator 144 may surround the stack of laminations 146.

The division wall 140 may be connected to the inner surface of the compressor 104 and may have an opening for the compressor shafts 126 and the rotor 142 (stack of laminations 146 and flat plates 148). The two sides of the compressor 104 separated by the division wall 140 may have different pressure levels. In example embodiments, a seal 160 (for example, a labyrinth seal) may be located in the gap between the division wall 140 and the rotor 142 on both sides of the axially split bearing stator 144 to limit (or alternatively, control) the leakage of process gas from a higher pressure side to a lower pressure side. In example embodiments, more than one seal may be present in the gap between the division wall 140 and the rotor 142. FIG. 3 illustrates two seals 160, one on each side of the axially split bearing stator 144. Herein, the seals 160 may be positioned on the flat plates 148.

Figure 4:
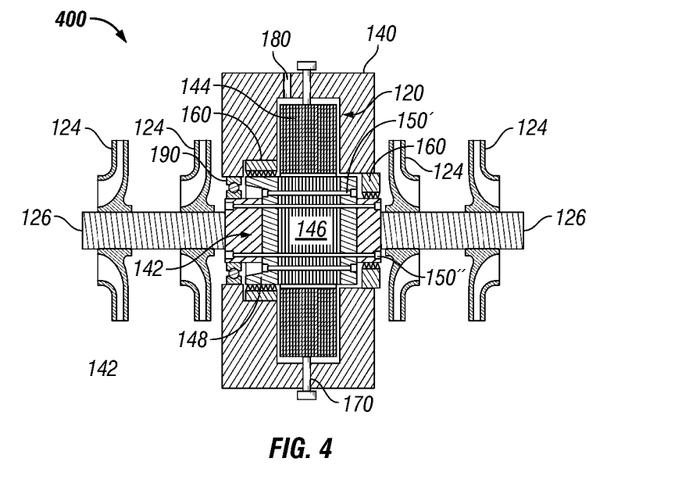
FIG. 4 illustrates a cross-sectional view of another configuration of the division wall and the intermediate radial bearing of the exemplary compression system of FIG. 1, according to one or more embodiments disclosed.

FIG. 4 illustrates a cross-sectional view of another configuration 400 of the division wall 140 and the intermediate radial bearing 120 of the exemplary compression system 100 of FIG. 1, according to one or more embodiments disclosed. The configuration 400 may be similar in some respects to the configuration 300 illustrated in FIG. 3 and therefore may again be best understood with reference to the description of FIG. 3 where like numerals designate like components and will not be described again in detail. In FIG. 4, one of the seals 160 may be positioned on the compressor shaft 126 (for example, on a flange of the compressor shaft) on one side of the axially split bearing stator 144 and the other seal 160 may be positioned on the flat plates 148 on the opposite side of the axially split bearing stator 144. It should be noted that the seals 160 may be stationary.

FIGS. 3 and 4 illustrate a stator adjusting mechanism 170, according to one or more embodiments disclosed. The stator adjusting mechanism 170 may adjust a position of the axially split bearing stator 144 of the intermediate radial bearing 120 with respect to the division wall 140. In an exemplary embodiment, the stator adjusting mechanism 170 may include a threaded mechanism, for example, a screw or bolt, in at least two locations diametrically opposite to each other in the division wall 140. The threaded mechanisms may be actuated to adjust a position of the axially split bearing stator 144. For example, sag may be observed in the rotor 142 of the intermediate radial bearing 120. In such instances, it may be beneficial not to have the axially split bearing stator 144 centered in the division wall 140, but to be able to adjust the position of the axially split bearing stator 144 with respect to the division wall 140, for example, with respect to the inner diameter of the division wall 140. Accordingly, in certain applications, to accommodate for the sag in the rotor 142, the stator adjusting mechanism 170 may be adjusted to lower (with references to FIGS. 3 and 4) the axially split bearing stator 144 with respect to the division wall 140. However, in certain applications, the axially split bearing stator 144 may also be raised with respect to the division wall 140.

FIGS. 3 and 4 also illustrate a seal reference inlet 180, according to one or more embodiments disclosed. The seal reference inlet 180 may supply clean seal gas such that there may be a relatively higher pressure in division wall 140 (for example, as compared to a pressure in the compressor 104). The intermediate radial bearing 120 may be cooled by the seal gas and the seal gas may then leak into the process gas through the seals 160 on one or both sides of the axially split bearing stator 144 of the intermediate radial bearing 120.

FIGS. 3 and 4 also illustrate a rundown bearing 190, according to one or more embodiments described herein. Although shown on one side of the axially split bearing stator 144, the rundown bearing 190 may be located on both sides of the axially split bearing stator 144. The failure of the intermediate radial bearing 120 may cause the compressor shafts 126 to drop causing damage to the compressor shafts 126 and/or the surrounding components. The rundown bearing 190 may prevent damage to the compressor shafts 126 and/or the surrounding components by supporting the compressor shafts 126 in the event the intermediate radial bearing 120 fails. The rundown bearing 190 may be, for example, of a ball bearing type mounted on the division wall 140. Alternatively, an axially-split sleeve type auxiliary bearing or a planetary type auxiliary bearing may be used.

Figure 5:
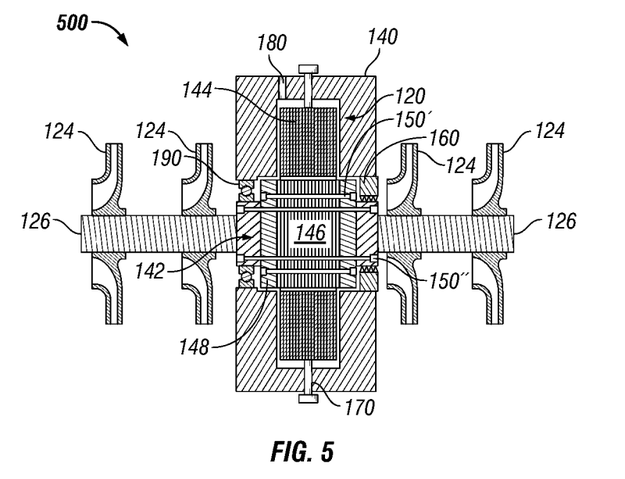
FIG. 5 illustrates a cross-sectional view of a configuration of a division wall and an intermediate radial bearing of the exemplary compression system of FIG. 2, according to one or more embodiments disclosed.
Figure 6:
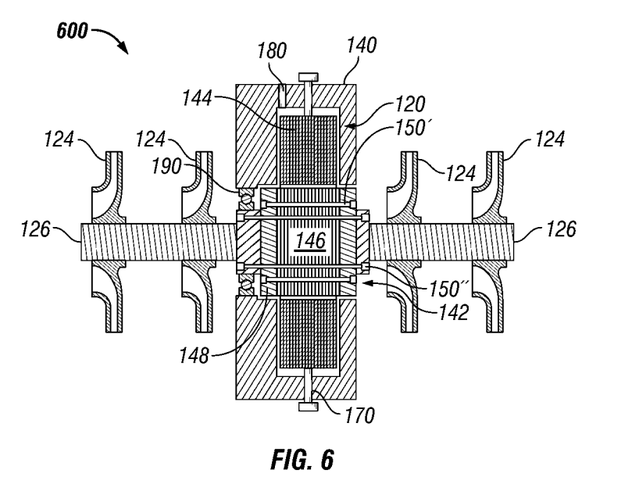
FIG. 6 illustrates a cross-sectional view of another configuration of the division wall and the intermediate radial bearing of the exemplary compression system of FIG. 2, according to one or more embodiments disclosed.

FIG. 5 illustrates a cross-sectional view of a configuration 500 of a division wall 140 and an intermediate radial bearing 120 of the exemplary compression system 200 of FIG. 2, according to one or more embodiments disclosed. FIG. 6 illustrates a cross-sectional view of a configuration 600 of the division wall 140 and the intermediate radial bearing 120 of the exemplary compression system 200 of FIG. 2, according to one or more embodiments disclosed. The configurations 500, 600 of the intermediate radial bearing 120 and the division wall 140 in the compressor 204 may be similar in some respects to the configurations 300, 400 illustrated in FIGS. 3 and 4, and, therefore, may be best understood with reference to the description of FIGS. 3 and 4, where like numerals designate like components and will not be described again in detail.

The division wall 140 in FIG. 5 may have a seal 160 on one side (for example, only on one side) of the axially split bearing stator 144. In such a single seal configuration, it may be beneficial to position the seal 160 on any one of the compressor shafts 126 or the flat plates 148 having a smaller diameter as compared to each other. Accordingly, as shown in FIG. 5, the seal 160 may be positioned on the compressor shaft 126 that has a smaller diameter as compared to the flat plates 148. It should be noted that the seal 160 may be stationary. According to exemplary embodiments, depending on applications, a seal(s) 160 may not be required, as illustrated in FIG. 6. Herein, the gap between the rotor 142 and the division wall 140 may be small enough to limit the flow of process gas from one side of the compressor 204 to the other side without requiring a seal(s).

In an exemplary embodiment, the configurations 500, 600 of the intermediate radial bearing 120 and the division wall 140 in the compressor 204 illustrated in FIGS. 5 and 6 may be utilized in the compressor 104 illustrated in FIGS. 3 and 4 in place of the configurations 300, 400. In another exemplary embodiment, the configurations 300, 400 of the intermediate radial bearing 120 and the division wall 140 of the compressor 104 illustrated in FIGS. 3 and 4 may be utilized in the compressor 204 illustrated in FIGS. 5 and 6 in place of the configurations 500, 600.

According to example embodiments, seals 160 may assist in compensating for the axial thrust experienced by the compressor shafts 126. For example, with reference to FIG. 4, the different diameter of the seals 160 may result in an axial thrust from the larger diameter seal positioned on the flat plates 148 to the smaller diameter seal positioned on the compressor shaft 126 (direction of the axial thrust may be from left to right in FIG. 4). Employing such different diameter seals may reduce a size of the axial thrust bearing 122 and/or the balance piston 123 (FIGS. 1 and 2).

In order to achieve relatively precise and consistent radial concentricity of the stack of laminations 146, the stack of laminations 146 may be permanently mounted on the rotor 142 and finish grounded with the compressor shafts 126 to prevent changes in concentricity during assembly and/or disassembly.

Figure 7:
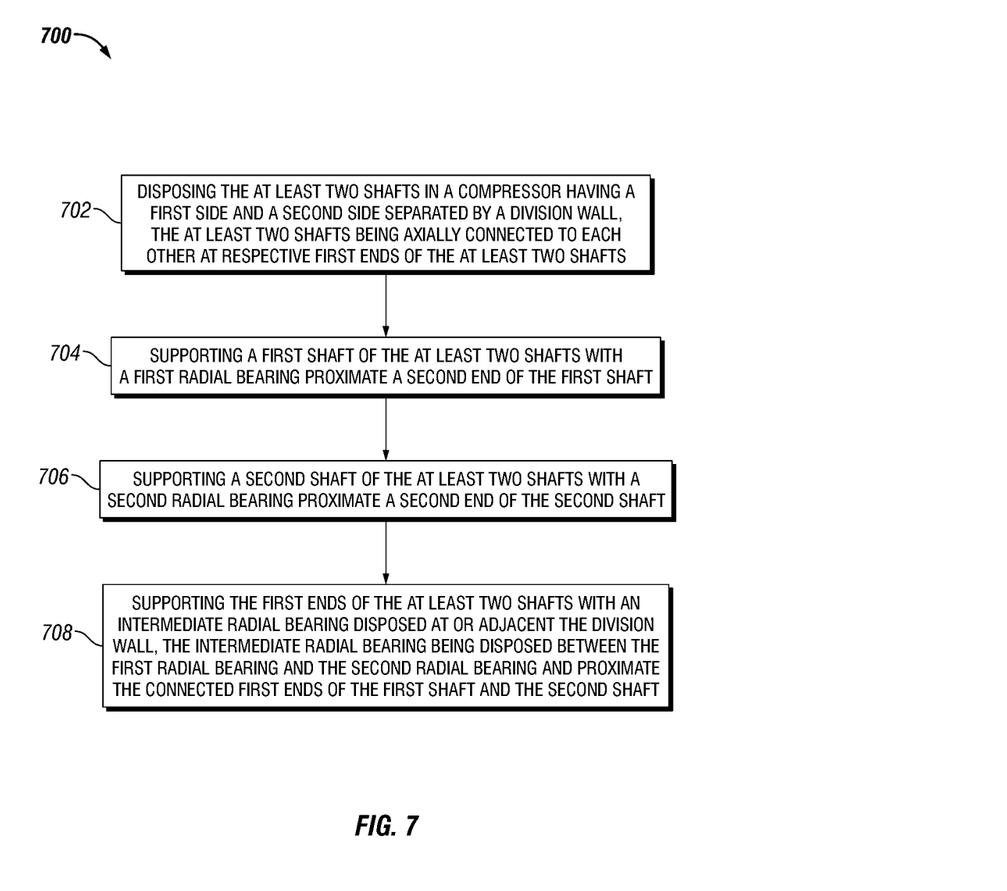
FIG. 7 illustrates a flowchart schematic of an exemplary method for supporting at least two shafts, according to one or more embodiments disclosed.

FIG. 7 illustrates a flowchart schematic of an exemplary method 700 for supporting at least two shafts, according to one or more embodiments disclosed. The method 700 may include disposing the at least two shafts in a compressor having a first side and a second side separated by a division wall, as at 702. The at least two shafts may be axially connected to each other at respective first ends of the at least two shafts. The method may also include supporting a first shaft of the at least two shafts with a first radial bearing proximate a second end of the first shaft, as at 704.

Further, the method may include supporting a second shaft of the at least two shafts with a second radial bearing proximate a second end of the second shaft, as at 706, and supporting the first ends of the at least two shafts with an intermediate radial bearing disposed at or adjacent the division wall, as at 708. The intermediate radial bearing may be disposed between the first radial bearing and the second radial bearing and proximate the connected first ends of the first shaft and the second shaft.

The above described embodiments may provide numerous advantages over the existing designs. The laminated stack of the rotor portion of a tie-bolted rotor with active magnetic bearing may provide relatively easy assembly and disassembly of the bearing components as compared to the traditional interference-fit laminated-sleeve design typically used, and may provide a stiff and compact shaft joint. The intermediate radial bearing may incorporate an integral coupling flange on each of the compressor shafts. As a result, it may not be required to install a lamination sleeve over the end of the compressor shafts. Integrating the seal(s) into the intermediate radial bearing may allow using the seal gas to cool the intermediate radial bearing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A compression system, comprising:
   a housing;
   a compressor within the housing, the compressor having a first side and a second side separated by a division wall;
   a first shaft and a second shaft disposed within the compressor, each of the first shaft and the second shaft having a first end and a second end, and the first shaft and the second shaft being axially connected to each other at the respective first ends and being configured to rotate together;
   a first radial bearing disposed proximate the second end of the first shaft and configured to support the first shaft;
   a second radial bearing disposed proximate the second end of the second shaft and configured to support the second shaft; and
   an intermediate radial bearing surrounded by the division wall, the intermediate radial bearing being disposed between the first radial bearing and the second radial bearing and proximate the connected first ends of the first shaft and the second shaft, and the intermediate radial bearing comprising:
      a rotor portion including a plurality of laminations stacked between a first plate and a second plate fastened to each other; and
      a stator portion surrounding the rotor portion and configured to be axially separated into two or more components.

2. The compression system of claim 1, wherein the first shaft and the second shaft are fastened to the first plate and the second plate, respectively, or the first shaft and the second shaft are fastened to each other using fasteners that pass through the stacked plurality of laminations.

3. The compression system of claim 1, wherein at least one seal is disposed between the division wall and each of the first plate and the second plate.

4. The compression system of claim 1, wherein at least one seal is disposed between the division wall and one of the first plate and the second plate.

5. The compression system of claim 1, wherein a first seal is disposed between the division wall and one of the first shaft and the second shaft, and a second seal is disposed between the division wall and one of the first plate and the second plate, the first seal and the second seal being on opposite sides of the rotor portion.

6. The compression system of claim 5, wherein the first seal and the second seal have different radii.

7. The compression system of claim 1, further comprising a stator adjusting mechanism configured to adjust a position of the stator portion.

8. The compression system of claim 1, wherein at least one seal is disposed between the division wall and each of the first shaft and the second shaft.

9. The compression system of claim 1, further comprising a seal reference inlet configured to supply a seal gas to the division wall, a pressure of the seal gas being greater than a pressure of a process gas in the compressor.

10. The compression system of claim 1, further comprising a rundown bearing proximate the intermediate radial bearing and mounted on the division wall.

11. A method for supporting at least two shafts, comprising:
    disposing the at least two shafts in a compressor having a first side and a second side separated by a division wall, the at least two shafts being axially connected to each other at respective first ends of the at least two shafts;
    supporting a first shaft of the at least two shafts with a first radial bearing proximate a second end of the first shaft;
    supporting a second shaft of the at least two shafts with a second radial bearing proximate a second end of the second shaft; and
    supporting the first ends of the at least two shafts with an intermediate radial bearing disposed at or adjacent the division wall, the intermediate radial bearing being disposed between the first radial bearing and the second radial bearing and proximate the connected first ends of the first shaft and the second shaft, wherein the first ends of the first shaft and the second shaft are connected to a rotor portion of the intermediate radial bearing, the rotor portion includes a plurality of laminations stacked between a first plate and a second plate fastened to each other, the first shaft and the second shaft are fastened to the first plate and the second plate, respectively, or to each other using fasteners that pass through the plurality of stacked laminations, and an axially separable stator portion is disposed surrounding the rotor portion.

12. The method of claim 11, further comprising:
sealing a gap between the division wall and at least one of the first plate and the second plate.

13. The method of claim 11, further comprising:
sealing a first gap between the division wall and one of the first plate and the second plate using a first seal; and
sealing a second gap between the division wall and one of the at least two shafts using a second seal, the first seal and the second seal being disposed on opposite sides of the rotor portion, and the first seal and the second seal having different radii.

14. The method of claim 11, further comprising:
sealing a gap between the division wall and each of the first shaft and the second shaft.

15. The method of claim 11, further comprising:
adjusting a position of the rotor portion within the division wall.

16. A compression system, comprising:
a compressor having a first side and a second side separated by a division wall;
a first shaft and a second shaft within the compressor, the first shaft and the second shaft being axially connected to each other at respective first ends via a rotor portion of an intermediate radial bearing, the rotor portion including a plurality of laminations stacked between a first plate and a second plate fastened to each other;
a first radial bearing disposed on a first side of the intermediate radial bearing and proximate a second end of the first shaft, the first radial bearing configured to support the first shaft; and
a second radial bearing disposed on a second side opposite to the first side of the intermediate radial bearing and proximate a second end of the second shaft, the second radial bearing configured to support the second shaft.

17. The compression system of claim 16, wherein a first seal is disposed between the division wall and one of the first shaft and the second shaft, and a second seal is disposed between the division wall and one of the first plate and the second plate, the first seal and the second seal being on opposite sides of the rotor portion, and the first seal and the second seal having different radii.

18. The compression system of claim 16, wherein at least one seal is disposed between the division wall and each of the first plate and the second plate.

* * * * *